(12) United States Patent
Hirata et al.

(10) Patent No.: US 9,511,576 B2
(45) Date of Patent: Dec. 6, 2016

(54) ROTARY LAMINATION APPARATUS

(71) Applicant: TOYOTA BOSHOKU KABUSHIKI KAISHA, Aichi-ken (JP)

(72) Inventors: Kazuyuki Hirata, Toyota (JP); Shirou Fujimura, Miyoshi (JP); Hajime Banno, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 13 days.

(21) Appl. No.: 14/671,109

(22) Filed: Mar. 27, 2015

(65) Prior Publication Data

US 2015/0202856 A1 Jul. 23, 2015

Related U.S. Application Data

(62) Division of application No. 13/186,972, filed on Jul. 20, 2011, now Pat. No. 9,016,345.

(30) Foreign Application Priority Data

Aug. 31, 2010 (JP) .................................. 2010-194063

(51) Int. Cl.
*B29C 65/00* (2006.01)
*B32B 37/00* (2006.01)
(Continued)

(52) U.S. Cl.
CPC ............... *B32B 38/04* (2013.01); *B21D 28/22* (2013.01); *B29C 66/45* (2013.01); *B29C 66/8322* (2013.01);
(Continued)

(58) Field of Classification Search
CPC .. B23B 37/00; B23B 37/0046; B23B 37/0076; B23B 37/04; B23B 37/06; B23B 37/065; B23B 38/185; B23B 38/04; B23B 38/06; B29C 2793/0045; B29C 65/02; B29C 65/005; B29C 65/006; B29C 66/45; B29C 66/8322; B26D 9/00; H02K 15/02; H02K 15/03; H02K 15/16; Y10T 29/49009; Y10T 29/49012; Y10T 29/53143
(Continued)

(56) References Cited

U.S. PATENT DOCUMENTS 4,418,464 A * 12/1983 DiGiacomo .......... B23P 21/006
29/564.1
4,596,508 A * 6/1986 Kishi ....................... E02F 3/32
212/247
(Continued)

FOREIGN PATENT DOCUMENTS

CN 1595771 3/2005
CN 1929260 3/2007
(Continued)

OTHER PUBLICATIONS

Chinese Office action, dated Oct. 25, 2013 along with an english translation thereof.
(Continued)

*Primary Examiner* — Philip Tucker
*Assistant Examiner* — Brian R Slawski
(74) *Attorney, Agent, or Firm* — Greenblum & Bernstein, P.L.C.

(57) ABSTRACT

A rotary lamination apparatus has a die assembly rotatable about an axis and a mounting table received in an axial hole extending through the die assembly. Through rotation of the die assembly, punched core pieces are mounted on the mounting table while being rotatively offset. A drive portion is employed to rotate the mounting table integrally with the die assembly about the axis of the die assembly.

3 Claims, 6 Drawing Sheets

(51) Int. Cl.
  *B32B 38/04*   (2006.01)
  *B32B 38/10*   (2006.01)
  *B31F 5/00*   (2006.01)
  *B23K 37/00*   (2006.01)
  *H02K 15/02*   (2006.01)
  *H02K 15/10*   (2006.01)
  *B23P 19/00*   (2006.01)
  *H02K 15/00*   (2006.01)
  *H02K 1/06*   (2006.01)
  *B21D 28/22*   (2006.01)

(52) U.S. Cl.
  CPC .......... *B32B 37/0046* (2013.01); *H02K 15/02* (2013.01); *H02K 2201/09* (2013.01); *Y10T 29/49012* (2015.01); *Y10T 29/53143* (2015.01); *Y10T 156/1304* (2015.01); *Y10T 156/1322* (2015.01); *Y10T 156/1761* (2015.01)

(58) Field of Classification Search
  USPC ......... 156/60, 196, 212, 213, 250, 252, 256, 156/261, 263, 264, 349, 350, 353, 358, 156/362, 363, 364, 423, 510, 512, 513, 156/516, 517, 538, 539, 556, 558, 559, 156/563, 580, 581, 582, 518; 228/115, 228/3.1; 29/596, 598, 732 738, 609; 310/216, 254, 261
  See application file for complete search history.

(56) References Cited

U.S. PATENT DOCUMENTS

| | | | | |
|---|---|---|---|---|
| 5,336,030 A | * | 8/1994 | Ostwald | G07F 7/069 414/277 |
| 5,960,533 A | | 10/1999 | Neuenschwander | |
| 6,042,688 A | * | 3/2000 | Masumura | B24B 37/28 156/345.14 |
| 2005/0023925 A1 | | 2/2005 | Yamamoto et al. | |
| 2005/0050714 A1 | * | 3/2005 | Hashimoto | H02K 15/02 29/596 |
| 2005/0229382 A1 | | 10/2005 | Yamamoto et al. | |
| 2005/0229384 A1 | | 10/2005 | Yamamoto et al. | |
| 2008/0282530 A1 | | 11/2008 | Bertocchi et al. | |
| 2011/0095072 A1 | | 4/2011 | Fujimura et al. | |

FOREIGN PATENT DOCUMENTS

| | | | | |
|---|---|---|---|---|
| DE | 2838685 | | 3/1980 | |
| EP | 0084568 | | 8/1983 | |
| JP | 2001-286946 | | 10/2001 | |
| JP | 2003-019520 | | 1/2003 | |
| JP | 2006-026735 | | 2/2006 | |
| JP | 2009-195099 | | 8/2009 | |
| JP | 2010-045921 | | 2/2010 | |
| JP | 2010045921 A | * | 2/2010 | ............ H02K 15/02 |
| JP | 2011-062732 | | 3/2011 | |

OTHER PUBLICATIONS

Japanese Office Action, dated Dec. 17, 2013.
German Office action, dated May 16, 2014 along with an english translation thereof.
Office Action, with English-language translation thereof, for CN Patent Appl. No. 201410601896.9 having a mailing date of Oct. 9, 2015.

* cited by examiner

ROTARY LAMINATION APPARATUS

CROSS REFERENCE TO RELATED APPLICATION

This application is a divisional of application Ser. No. 13/186,972 filed Jul. 20, 2011, now U.S. Pat. No. 9,016,345 and which claims priority to Japanese Application No. 2010-194063, filed Aug. 31, 2010, the disclosures of which are expressly incorporated herein by reference in their entireties.

BACKGROUND OF THE INVENTION

The present invention relates to an apparatus for manufacturing a core for a rotational electric machine, such as a stator core or a rotor core for a motor, and, more particularly, a rotary lamination apparatus that laminates core pieces punched from thin plates, while rotatively offsetting the core pieces.

A core WA shown in FIGS. 6 and 7 is formed by layering core pieces Wa. The core WA is maintained in a layered state through engagement between a plurality of projections Pa of each of the core pieces Wa and adjacent recesses of the core piece Wa.

An apparatus for manufacturing this type of core is disclosed in, for example, Japanese Laid-Open Patent Publication No. 2006-26735 (first conventional art) and Japanese Laid-Open Patent Publication No. 2003-19520 (second conventional art).

In the first conventional art, a punch is arranged above and faces a die in a manner movable in the axial direction. As the punch reciprocates with respect to the die, a core piece is punched out from a thin plate mounted on the die. A pressing ring is arranged below the die. An axial hole extends through the centers of the die and the pressing ring, and receives a mounting table, which is movable in the axial direction of the die. After having been punched using the punch and the die, a core piece is pressed and held by the pressing ring from the outer circumference. The core piece is then mounted on the mounting table and subsequent core pieces are sequentially layered on the core piece. A core is thus manufactured. When a punched core piece is mounted on the mounting table, an elastic member arranged on the mounting table applies force acting in the opposite direction to the direction in which the punch presses, or counter pressure, to the laminated core. This prevents parallelism defect and formation of gaps between layers.

In the second conventional art, a die is rotatable. Each time a single core piece or a predetermined number of core pieces are punched by a punch and the die, the die and a pressing ring are rotated integrally with the core piece(s) at a predetermined angle. Through such rotation of the die and the pressing ring, the core pieces are layered while being rotatively offset, with offset phases. This prevents the lamination thickness of a laminated core from becoming non-uniform due to thicknesses deviation of punched core pieces.

However, the above-described conventional configurations have the problems described below.

In the first conventional art, core pieces are stacked on the mounting table in a constant phase (orientation) without being rotated after having been punched out. This causes a non-uniform lamination thickness in a laminated core, which is brought about by thicknesses deviation of the core pieces. Accordingly, if a rotor core for a motor, for example, is manufactured, rotation accuracy such as rotation balance is decreased and thus the motor characteristics are deteriorated.

In contrast, in the second conventional art, the core pieces are layered while being rotatively offset through rotation of the die and the pressing ring. The problem caused by the first conventional art is thus prevented. However, the second conventional art does not include a mounting table that applies the counter pressure to a laminated core. As a result, unlike the first conventional art, the second conventional art cannot prevent parallelism defect of the laminated core or gap formation between layers.

Alternatively, in an apparatus having a rotatable die and a rotatable pressing ring like those from the second conventional art, a mounting table may be arranged in an axial hole formed in the die, as in the first conventional art. However, in this configuration, core pieces are mounted on the mounting table while being rotatively offset through rotation of the die and the pressing ring with the mounting table held in a stationary state without being rotated. This rotates a laminated core formed on the mounting table relative to the mounting table, causing the core and the table to rub against each other. This may form an abrasion mark on a core piece. Also, when a core is already mounted on the mounting table and an additional core piece is mounted on the uppermost core piece of the core while being rotatively offset, the upper and lower cores rotate relative to each other, causing projections Pa to form a clear linear abrasion mark on the cores. The abrasion mark may influence formation of magnetic paths, thus lowering the performance of the products.

SUMMARY OF THE INVENTION

Accordingly, it is an objective of the present invention to provide a rotary lamination apparatus capable of preventing abrasion between a laminated core and a mounting table when the laminated core is formed by rotatively offsetting and mounting core pieces on the mounting table through rotation of a die assembly, thereby preventing performance of a product from deteriorating.

To achieve the foregoing objective and in accordance with one aspect of the present invention, a rotary lamination apparatus for layering punched out core pieces while rotatively offsetting the core pieces is provided. The apparatus includes a die assembly having a die, a mounting table, and a drive portion. The die assembly has an axial hole and an axis, and is rotatable about the axis. The mounting table is received in the axial hole of the die assembly. The core pieces are layered while being rotatively offset on the mounting table through rotation of the die assembly. The drive portion rotates the mounting table integrally with the die assembly about the axis of the die assembly.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A rotary lamination apparatus according to a first embodiment of the present invention will now be described with reference to FIGS. 1 and 2.

Figure 1:
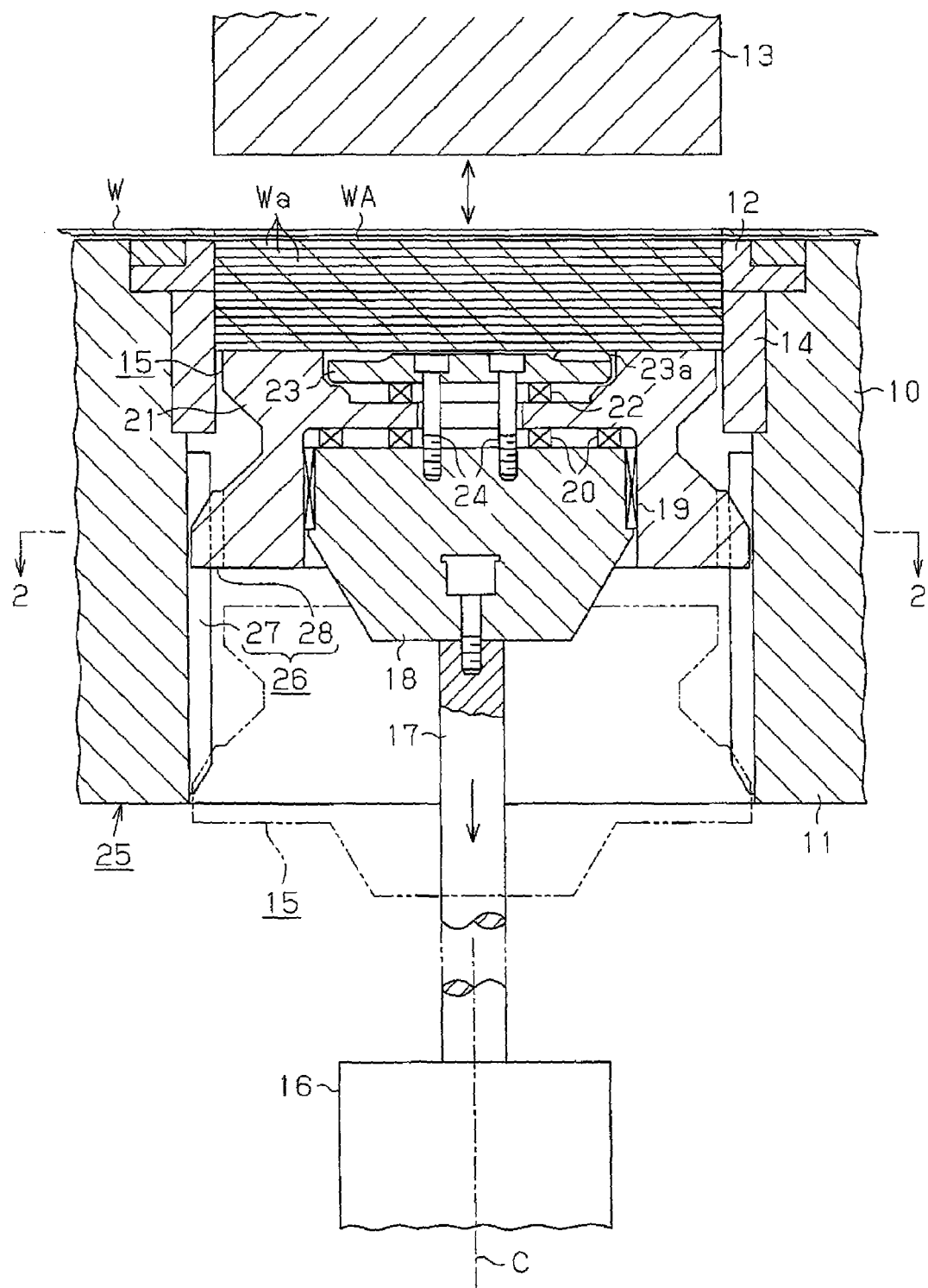
FIG. 1 is a cross-sectional view showing a main portion of a rotary lamination apparatus according to a first embodiment of the present invention.
Figure 2:
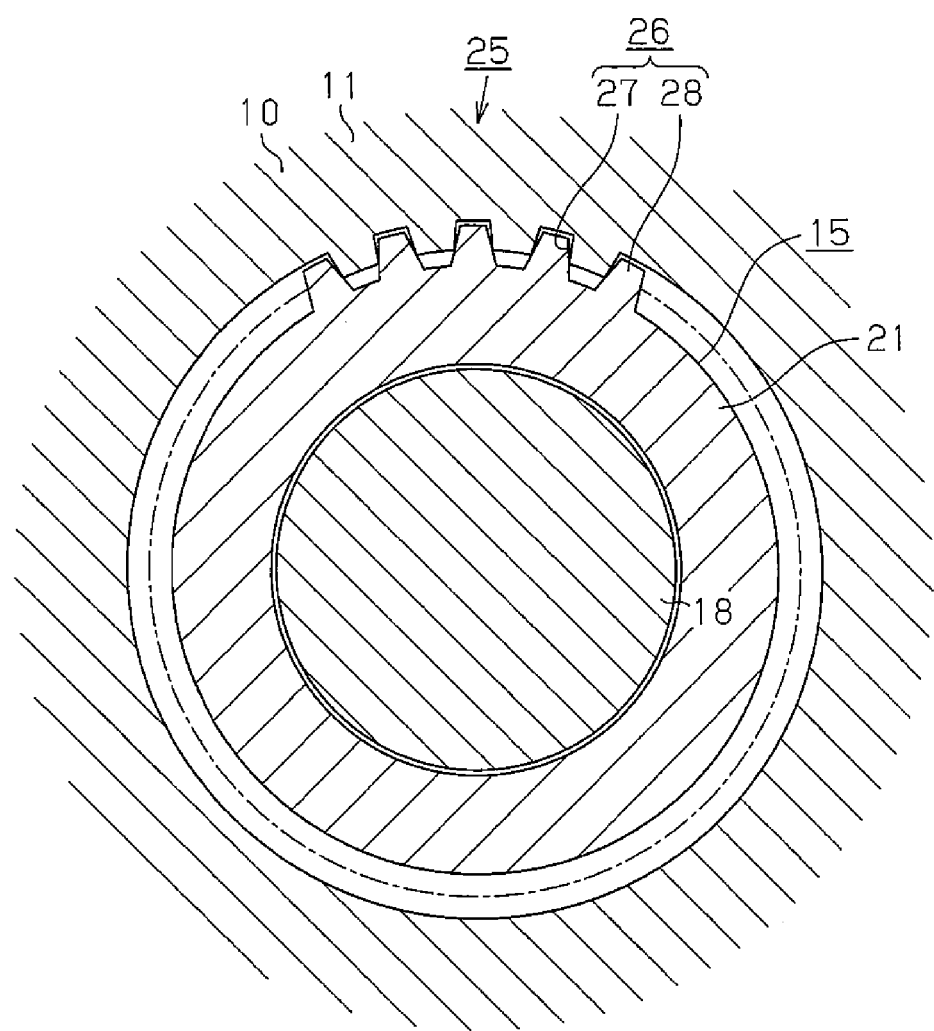
FIG. 2 is a partially cross-sectional view taken along line 2-2 of FIG. 1.

As illustrated in FIG. 1, the rotary lamination apparatus includes a holding member 11, which is rotatable about a vertical axis C. The holding member 11 is rotated intermittently by a predetermined angle at a time by a non-illustrated motor. An annular die 12 is fixedly attached to the upper inner circumferential edge of the holding member 11. A punch 13 is arranged above the die 12 and can be reciprocated along the vertical axis C. With a belt-like thin plate W mounted on the holding member 11, the punch 13 is reciprocated in an upward-downward direction with respect to the die 12. In this manner, a core piece Wa having a prescribed shape is punched out of the thin plate W.

A cylindrical pressing ring 14 is fixedly attached to the inner circumference of the holding member 11 at a position below the die 12. The pressing ring 14 applies pressure to the outer circumferential surface of the core piece Wa after the core piece Wa has been punched out. The holding member 11 and the pressing ring 14 form a die assembly 10.

An axial hole extends through the die assembly 10 accommodates a mounting table 15, which is movable along the vertical axis C. After having been punched out by the punch 13 and the die 12, core pieces Wa are pressed and held by the pressing ring 14 from the outer circumference and mounted and layered sequentially on the mounting table 15. At this time, the die assembly 10 is rotated by the non-illustrated motor, and the die 12 and the pressing ring 14 are rotated integrally with the holding member 11. As a result, with the thin plate W on the holding member 11 maintained without rotating, the punched core pieces Wa are layered while being rotatively offset on the mounting table 15. This forms a laminated core WA for a rotating electric machine, such as a stator core or a rotor core for a motor.

In this case, when a punched core piece Wa is mounted on the mounting table 15, a lift mechanism 16 including a motor raises the mounting table 15 through a shaft 17. This applies counter pressure acting in the opposite direction to the pressing direction of the punch 13 to the laminated core WA on the mounting table 15. At this stage, the top surface of the uppermost core piece Wa on the mounting table 15 is located flush with the top surface of the die 12.

The mounting table 15 has a support member 18 and a receiving table 21. The support member 18 is fixed to the upper end of the shaft 17. The receiving table 21 is arranged above the support member 18 and supported rotatably about the vertical axis C through a radial bearing 19 and thrust bearings 20. A holding plate 23 is mounted on the receiving table 21 through a thrust bearing 22 in a manner rotatable relative to the receiving table 21. The holding plate 23 is fixed to the support member 18 by means of a plurality of bolts 24. The receiving table 21 is thus held by the support member 18 and is prevented from separating from the support member 18. Core pieces Wa are mounted on the receiving table 21. A sensor 23a for detecting a core piece Wa on the receiving table 21 is installed on the holding plate 23.

A drive mechanism 25 serving as drive means or a drive portion is arranged in the vicinity of the mounting table 15 to rotate the mounting table 15 integrally with the die 12 about the vertical axis C of the die assembly 12. In the first embodiment, the drive mechanism 25 is configured by the die assembly 10. A transmission mechanism 26 serving as transmission means is arranged between the holding member 11 and the mounting table 15 to transmit rotation of the holding member 11 to the mounting table 15.

The transmission mechanism 26 is arranged between the inner circumferential surface of the holding member 11 and the outer circumferential surface of the mounting table 15. The transmission mechanism 26 is configured by meshing means or a meshing mechanism that permits axial movement of the mounting table 15. Specifically, inner spline teeth (hereinafter, referred to simply as internal teeth) 27 are formed on the inner circumferential surface of the holding member 11. External spline teeth (hereinafter, referred to simply as external teeth) 28, which become meshed with the corresponding internal teeth 27 in an axially movable manner relative to the internal teeth 27, are formed on the outer circumferential surface of the receiving table 21 of the mounting table 15. The transmission mechanism 26 is configured by the internal teeth 27 and the external teeth 28. When the die assembly 10 is rotated to rotate the die 12 and the pressing ring 14 integrally, the receiving table 21 of the mounting table 15 is rotated integrally with the die assembly 10 through the internal teeth 27 and the external teeth 28 of the transmission mechanism 26.

The rotary lamination apparatus, which is configured as has been described, operates as described below.

With the thin plate W held on the holding member 11, the punch 13 is reciprocated with respect to the die 12, thus punching a core piece Wa having a prescribed shape out of the thin plate W. After having been punched out, core pieces Wa are pressed and held by the pressing ring 14 from the outer circumference, and mounted and sequentially layered on the receiving table 21 of the mounting table 15. In this case, in the transmission mechanism 26, the external teeth 28 of the receiving table 21 are axially moved relative to the internal teeth 27 of the holding member 11 to permit descent of the mounting table 15, and the lift mechanism 16 raises the mounting table 15 through the shaft 17, thus applying counter pressure acting in the opposite direction to the pressing direction of the punch 13 to a laminated core WA on the mounting table 15.

Each time a single core piece Wa or a predetermined number of core pieces Wa are punched out, the die assembly 10 is rotated integrally with the holding member 11 at a predetermined angle. In this manner, core pieces Wa are layered while being rotated with offset phases, and a laminated core WA is formed. This prevents the lamination thickness of the laminated core WA from becoming non-uniform due to thicknesses deviation of punched core pieces Wa.

Further, when core pieces Wa are layered while being rotatively offset from each other on the receiving table 21 of the mounting table 15 through rotation of the die assembly 10, rotation of the die assembly 10, which is a component of the drive mechanism 25, is transmitted to the receiving table 21 of the mounting table 15 through the transmission mechanism 26. This rotates a laminated core WA on the receiving table 21 integrally with the mounting table 15. As a result, the laminated core WA on the mounting table 15 and the mounting table 15 are prevented from rubbing against each other. Also, when a laminated core WA is maintained on the mounting table 15 and another core WA is laminated on the core WA while being rotatively offset, the cores CA do not rub against each other. The pitch of a single cycle of intermittent rotation of the die assembly 10 and the mounting table 15 is equal to the alignment pitch of the projections Pa of the core pieces Wa.

After a predetermined number of core pieces Wa are layered on the mounting table 15 in the above-described manner, the mounting table 15 is lowered below the position indicated by the lines formed by a long dash alternating with two short dashes in FIG. 1, to a position downward from the holding member 11. When the mounting table 15 is located at this position, the core WA is transferred from the mounting table 15 for a subsequent step.

The first embodiment has the advantages described below.

(1) The drive mechanism 25 is provided to rotate the mounting table 15 integrally with the die assembly 10 about the axis of the die assembly 10.

Accordingly, each time a core piece Wa is punched out, the die assembly 10 is rotated at a predetermined angle. Through rotation of the die assembly 10, core pieces Wa are layered while being rotated with offset phases on core pieces Wa on the mounting table 15, and a laminated core WA is formed. This prevents the lamination thickness of the laminated core WA from becoming non-uniform due to thicknesses deviation of punched core pieces Wa. Also, when a punched core piece Wa is mounted while being rotatively offset on the mounting table 15 through rotation of the die assembly 10, the drive mechanism 25 rotates the mounting table 15 integrally with the die assembly 10 about the axis of the die assembly 10. This prevents the core piece Wa and the mounting table 15 or another core piece Wa from rubbing against each other. The core pieces Wa are thus protected against abrasion marks. As a result, a core WA that has a uniform lamination thickness and is free from abrasion marks is obtained. In this manner, cores WA with improved characteristics are manufactured.

(2) The drive mechanism 25 is configured by the die assembly 10 having the die 12. The transmission mechanism 26 for transmitting rotation of the die assembly 10 to the mounting table 15 is arranged between the die assembly 10 and the mounting table 15. As a result, using the rotation of the die assembly 10, the mounting table 15 is rotated integrally with the die assembly 10. In other words, the mounting table 15 is rotated by a simple structure.

(3) The transmission mechanism 26 is arranged between the die assembly 10 and the outer circumferential surface of the mounting table 15, and configured by the meshing means that permits axial movement of the mounting table 15. In other words, the transmission mechanism 26 is configured to be simple and capable of transmitting rotation of the die assembly 10 to the mounting table 15 accurately without loss.

Second Embodiment

Figure 3:
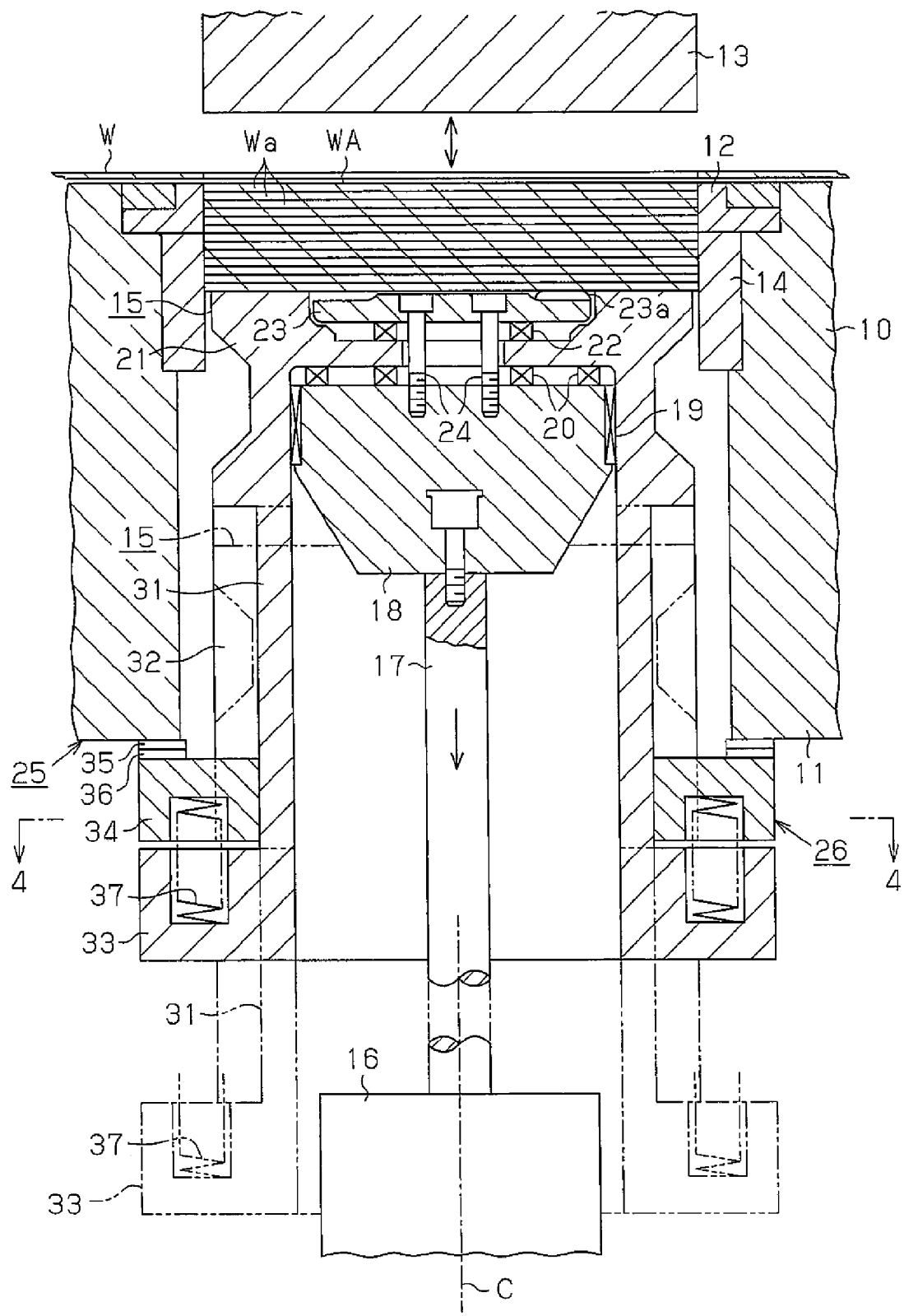
FIG. 3 is a cross-sectional view showing a main portion of a rotary lamination apparatus according to a second embodiment of the present invention.
Figure 4:
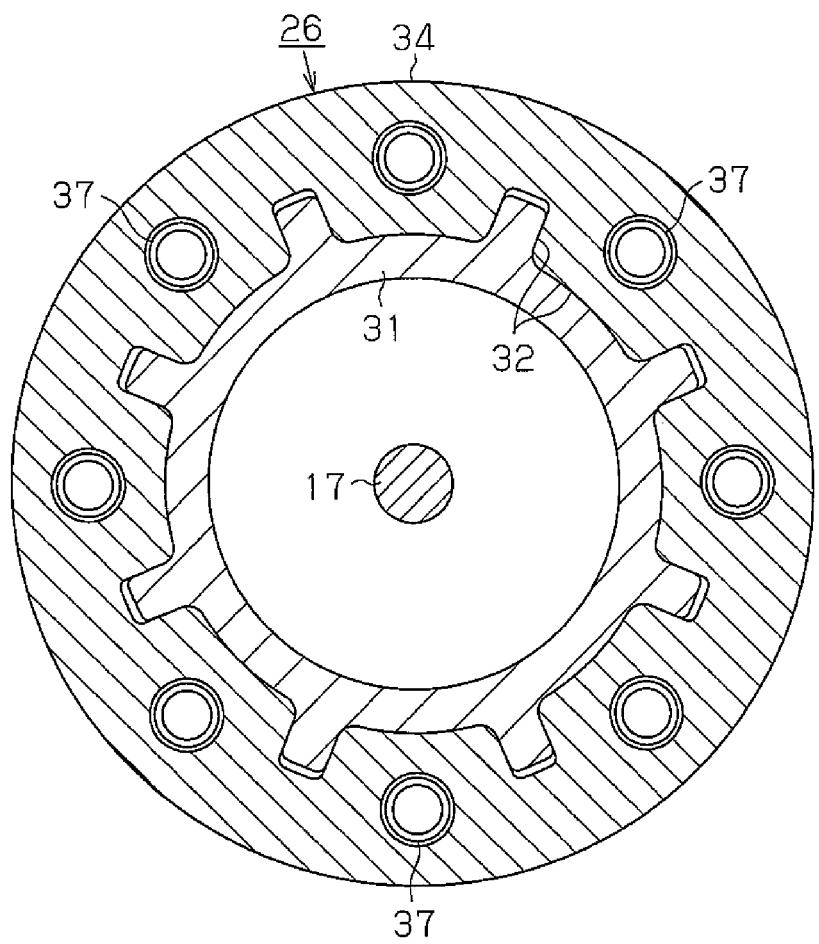
FIG. 4 is a cross-sectional view taken along line 4-4 of FIG. 3.

A rotary lamination apparatus according to a second embodiment of the present invention will hereafter be described with reference to FIGS. 3 and 4, mainly discussing the differences between the second embodiment and the first embodiment.

The second embodiment has a drive mechanism 25 configured by a die assembly 10 including a die 12, a pressing ring 14, and a holding member 11, like the first embodiment. However, in the second embodiment, a transmission mechanism 26 is configured differently from the transmission mechanism 26 of the first embodiment.

Specifically, in the transmission mechanism 26 of the second embodiment, a tubular portion 31 is arranged below the receiving table 21 of the mounting table 15 and extends in the axial direction. A guide 32 formed by sets of engaged projections and recesses is formed along the outer circumference of the tubular portion 31, extending in the axial direction. A spring seat 33 is formed along the lower outer circumferential edge of the tubular portion 31. An annular slider 34 is supported by the outer circumference of the tubular portion 31 through the guide 32 in such a manner that the slider 34 is rotatable integrally with the tubular portion 31 and movable relative to the tubular portion 31 in the axial direction.

A joint member 35 having a plurality of teeth that are aligned annularly is arranged at the lower inner circumferential edge of the holding member 11. A joint member 36 also including a plurality of teeth aligned in an annular shape is deployed at the upper outer circumferential edge of the slider 34. The joint members 35, 36 are meshed with each other. A plurality of springs 37 are arranged between the slider 34 and the spring seat 33. The springs 37 urge the slider 34 upward to maintain constant meshing between the joint members 35, 36. The die assembly 10 is thus rotated at constant angular intervals. When a core piece Wa is mounted on the receiving table 21 of the mounting table 15 while being rotatively offset, rotation of the die assembly 10 is transmitted to the receiving table 21 through the joint members 35, 36, the slider 34, the guide 32, and the tubular portion 31. The laminated core WA on the receiving table 21 is thus rotated integrally with the receiving table 21.

In the second embodiment, when the mounting table 15 is lowered, the tubular portion 31 below the receiving table 21 is moved through the guide 32 relative to the slider 34 in the axial direction. In this state, the slider 34 is maintained at a constant position by the urging force generated by the springs 37. This maintains the joint members 35, 36 in the engaged state, thus ensuring continuous transmission of the rotation to the mounting table 15.

As a result, the second embodiment ensures the advantages that are substantially the same as the advantages (1) to (3) of the first embodiment.

Third Embodiment

Figure 5:
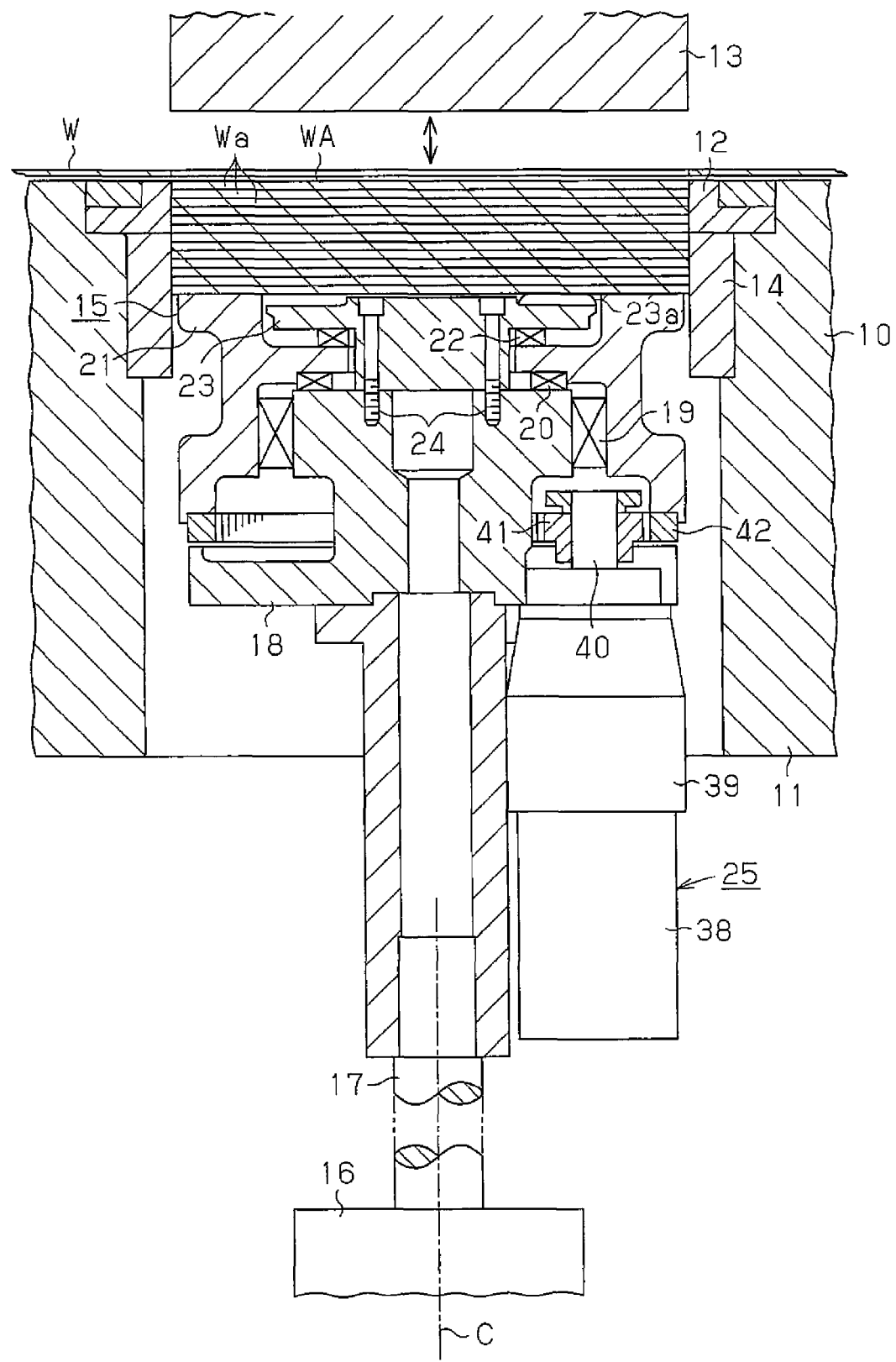
FIG. 5 is a cross-sectional view showing a main portion of a rotary lamination apparatus according to a third embodiment of the present invention.
Figure 6:
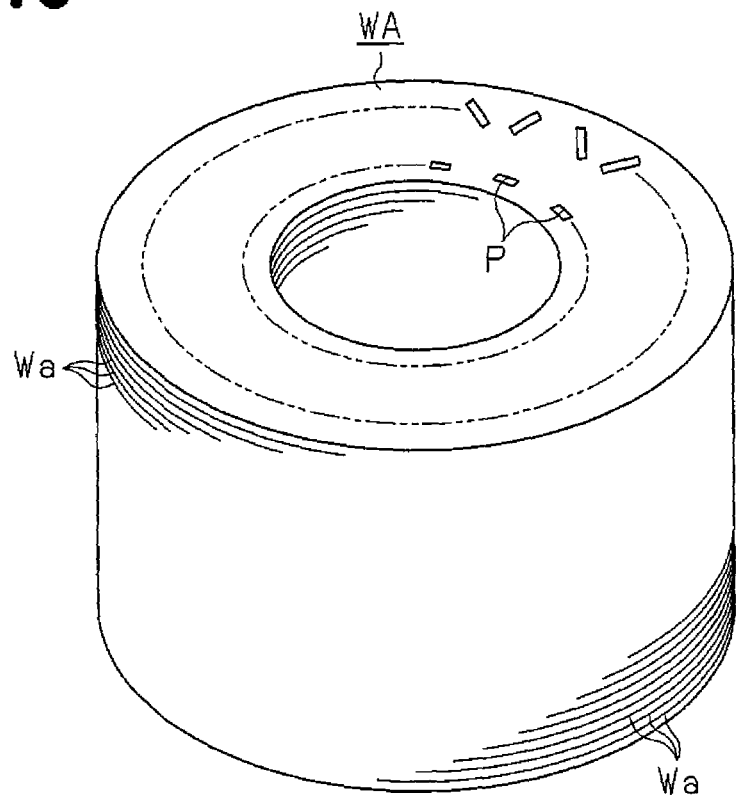
FIG. 6 is a perspective view showing a core.
Figure 7:
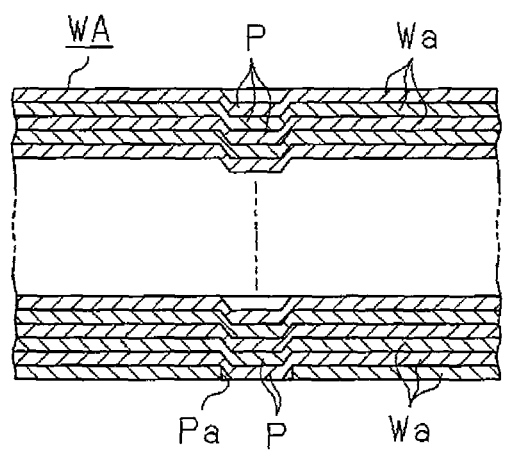
FIG. 7 is a cross-sectional view showing a portion of the core.

A rotary lamination apparatus according to a third embodiment of the present invention will hereafter be described with reference to FIG. 5, mainly discussing the differences between the third embodiment and the first embodiment.

The third embodiment is different from the first embodiment in the configuration of a drive mechanism 25, which rotates a mounting table 15. Specifically, a servomotor 38 having a decelerator 39, which configures the drive mechanism 25, is arranged outside and below a support member 18 of the mounting table 15 in such a manner that the servomotor 38 is movable integrally with the support member 18 in an upward-downward direction. A drive gear 41 configured by external teeth is fixed to a rotary shaft 40 of the servomotor 38. A driven gear 42 configured by internal teeth, which can mesh with the drive gear 41, is fixed to the lower end of the receiving table 21 of the mounting table 15.

The die assembly 10 is rotated at constant angular intervals. When a core piece Wa is mounted on the receiving table 21 of the mounting table 15 while being rotatively offset, the servomotor 38 is rotated synchronously with the die assembly 10. This rotates the receiving table 21 through the drive gear 41 and the driven gear 42. The laminated core WA on the receiving table 21 is thus rotated integrally with the die assembly 10.

The third embodiment has the advantage described below in addition to the advantage (1) of the first embodiment.

(4) The drive mechanism 25 is configured by the servomotor 38, which rotates the mounting table 15 synchronously with the die assembly 10. As a result, a rotary lamination apparatus operating in the same manner as the third embodiment is provided simply by slightly modifying a conventional rotary lamination apparatus and adding the servomotor 38 to the apparatus.

Modifications

The present invention may be embodied in the modified forms described below.

The invention may be embodied as a rotary lamination apparatus without the pressing ring 14.

In the third embodiment, the servomotor 38 may be installed at a position spaced from the mounting table 15. A drive force transmission mechanism such as a gear is arranged between the servomotor 38 and the mounting table 15.

Therefore, the present examples and embodiments are to be considered as illustrative and not restrictive and the invention is not to be limited to the details given herein, but may be modified within the scope and equivalence of the appended claims.

What is claimed is:

1. A rotary lamination apparatus for layering punched out core pieces while rotatively offsetting the core pieces, the rotary lamination apparatus comprising:
    a die assembly having a die, an axial hole and an axis, the die assembly being rotatable about the axis;
    a mounting table received in the axial hole of the die assembly; and
    a drive that rotates the mounting table integrally with the die assembly about the axis of the die assembly, the drive including a motor that rotates the mounting table integrally and synchronously with rotation of the die assembly, the motor including a rotary shaft, wherein
    through rotation of the die assembly, the rotary lamination apparatus is configured to layer the core pieces such that the core pieces are rotatively offset on the mounting table,
    a drive gear is fixed to the rotary shaft of the motor and a driven gear is fixed to the mounting table and is meshed with the drive gear, and
    the mounting table has a support member and a receiving table, the support member rotatably supports the receiving table such that the support member is configured to rotate relative to the receiving table, and the motor is arranged at a position displaced from the axis of the die assembly and below the support member of the mounting table such that the motor is movable integrally with the support member in an upward-downward direction of the rotary lamination apparatus.

2. The rotary lamination apparatus according to claim 1, wherein the drive gear includes external teeth and the driven gear includes internal teeth.

3. The rotary lamination apparatus according to claim 1, wherein the motor includes a servomotor.

* * * * *